(12) United States Patent
Wakimoto et al.

(10) Patent No.: US 11,342,618 B2
(45) Date of Patent: May 24, 2022

(54) SECONDARY BATTERY, METHOD OF MANUFACTURING THE SAME, AND METHOD OF MANUFACTURING CONDUCTIVE MEMBER FOR THE SAME

(71) Applicants: SANYO Electric Co., Ltd., Daito (JP); Panasonic Corporation, Kadoma (JP)

(72) Inventors: Ryoichi Wakimoto, Hyogo (JP); Eiji Hashimoto, Hyogo (JP)

(73) Assignees: SANYO Electric Co., Ltd., Daito (JP); Panasonic Holdings Corporation, Kadoma (JP)

( * ) Notice: Subject to any disclaimer, the term of this patent is extended or adjusted under 35 U.S.C. 154(b) by 517 days.

(21) Appl. No.: 16/334,470

(22) PCT Filed: Sep. 21, 2017

(86) PCT No.: PCT/JP2017/034036
§ 371 (c)(1),
(2) Date: Mar. 19, 2019

(87) PCT Pub. No.: WO2018/056345
PCT Pub. Date: Mar. 29, 2018

(65) Prior Publication Data
US 2021/0305647 A1    Sep. 30, 2021

(30) Foreign Application Priority Data

Sep. 26, 2016    (JP) .............................. JP2016-186841

(51) Int. Cl.
*H01M 50/186* (2021.01)
*H01M 50/50* (2021.01)
(Continued)

(52) U.S. Cl.
CPC ......... *H01M 50/186* (2021.01); *H01M 10/04* (2013.01); *H01M 50/50* (2021.01);
(Continued)

(58) Field of Classification Search
CPC .. H01M 50/186; H01M 50/50; H01M 50/562; H01M 50/505; H01M 10/04;
(Continued)

(56) References Cited

U.S. PATENT DOCUMENTS

| | | |
|---|---|---|
| 2001/0049054 A1 | 12/2001 | Enomoto et al. |
| 2005/0100785 A1 | 5/2005 | Enomoto et al. |
| 2014/0113164 A1* | 4/2014 | Nagata ................ H01M 50/578 |
| | | 429/61 |

FOREIGN PATENT DOCUMENTS

| | | |
|---|---|---|
| JP | 2002-151045 A | 5/2002 |
| JP | 2002-358945 A | 12/2002 |

(Continued)

OTHER PUBLICATIONS

Machine translation of JP 2002-151045A, Maruno et al., 2002 (Year: 2002).*

(Continued)

*Primary Examiner* — Kwang Han
(74) *Attorney, Agent, or Firm* — WHDA, LLP (57) ABSTRACT

A secondary battery including an electrode body including a positive electrode plate and a negative electrode plate; an exterior body that has an opening and houses the electrode body; a sealing body that seals the opening; a terminal that is provided in the sealing body, and connected to the positive electrode plate or the negative electrode plate; and a conductive member that is disposed on an outer side of the sealing body, and is connected to the terminal. The conductive member has an overlap section in which one end of a conductive plate-shaped member is folded and opposed surfaces are overlaid on other, and a base section in which no surfaces are overlaid on other, and the terminal is connected to the conductive member in the base portion.

10 Claims, 4 Drawing Sheets

(51) Int. Cl.
    *H01M 50/564*   (2021.01)
    *H01M 50/505*   (2021.01)
    *H01M 50/562*   (2021.01)
    *H01M 10/04*    (2006.01)

(52) U.S. Cl.
    CPC ....... *H01M 50/505* (2021.01); *H01M 50/562* (2021.01); *H01M 50/564* (2021.01)

(58) Field of Classification Search
    CPC ............ H01M 50/564; H01M 50/103; H01M 50/188; H01M 50/557; H01M 50/55; Y02E 60/10; Y02P 70/50
    See application file for complete search history.

(56) References Cited

FOREIGN PATENT DOCUMENTS

| | | |
|---|---|---|
| JP | 2008-311074 A | 12/2008 |
| JP | 2010-186705 A | 8/2010 |
| JP | 2012-123946 A | 6/2012 |
| JP | 5656592 B2 | 1/2015 |
| WO | 2013/065523 A1 | 5/2013 |
| WO | 2014/178130 A1 | 11/2014 |
| WO | WO 2014/178130 A1 * 11/2014 ........... H01M 50/502 |

OTHER PUBLICATIONS

Machine translation of WO 2014/178130A1, Kashino Hiroshi, 2014 (Year: 2014).*
International Search Report dated Oct. 24, 2017, issued in counterpart International Application No. PCT/JP2017/034036 (2 pages).

* cited by examiner

SECONDARY BATTERY, METHOD OF MANUFACTURING THE SAME, AND METHOD OF MANUFACTURING CONDUCTIVE MEMBER FOR THE SAME

TECHNICAL FIELD

The present invention relates to a secondary battery including a conductive member having a section connected to a positive electrode terminal or a negative electrode terminal and a section connected to a bus bar, a method of manufacturing the secondary battery, and a method of manufacturing the conductive member for the secondary battery.

BACKGROUND ART

In an assembled battery formed by electrically connecting multiple secondary batteries in series, the positive electrode terminal of one of secondary batteries in parallel, and the negative electrode terminal of the other secondary battery are welded with a bus bar. In this situation, when the positive electrode terminal and the negative electrode terminal are made of different types of metal, if the positive and negative terminals are welded using a single type of bus bar, welding between different types of metal occurs at one of the terminals. However, welding between different types of metal may be difficult depending on a combination of materials. For example, when the negative electrode terminal is made of copper, and the positive electrode terminal is made of aluminum, if a bus bar made of aluminum is welded to the negative electrode terminal, reliability of the welded joint may be significantly reduced.

To cope with such a problem, PTL 1 discloses a bus bar made of a laminated wood in which a metal plate made of metal of the same type as the positive electrode terminal, and a metal plate made of metal of the same type as the negative electrode terminal are laminated. The bus bar made of the laminated wood is twisted 180° at some midpoint in a longitudinal direction or both ends of the bus bar are bent 180° in opposite directions, thereby making it possible to arrange two types of metal plates on the same plane. Thus, it is possible to weld the positive electrode terminal and the negative electrode terminal of secondary batteries in parallel with a metal plate made of the same metal.

CITATION LIST

Patent Literature

PTL 1: Japanese Published Unexamined Patent Application No. 2002-151045

SUMMARY OF INVENTION

Technical Problem

However, in the bus bar disclosed in PTL 1, twist processing or bend processing needs to be performed on the laminated wood according to the interval between the secondary batteries arranged in parallel.

The present invention has been made in consideration of the above mentioned point, and it is an object of the invention to provide a secondary battery including a conductive member having a section connected to a positive electrode terminal or a negative electrode terminal and a section connected to a bus bar, the secondary battery having a simple configuration, the conductive member enabling reliable welding to the positive electrode terminal or the negative electrode terminal, and the bus bar.

Solution to Problem

A secondary battery according to the present invention includes: an electrode body including a positive electrode plate and a negative electrode plate; an exterior body that has an opening and houses the electrode body; a sealing body that seals the opening; a terminal that is provided in the sealing body, and connected to the positive electrode plate or the negative electrode plate; and a conductive member that is disposed on an outer side of the sealing body, and is connected to the terminal. The conductive member has an overlap section in which one end of a conductive plate-shaped member is folded and opposed surfaces are overlaid on other, and a base section in which no surfaces are overlaid on other, and the terminal is connected to the conductive member in the base portion.

In a preferred embodiment, the plate-shaped member includes a cladding material in which a first conductive member and a second conductive member each in a plate shape are stacked, the first conductive member is made of a same type of metal as the terminal, in the overlap section, the first conductive member is folded so that surfaces of the first conductive member are overlaid on other, in the conductive member, the first conductive member is exposed to a surface in the base section and the second conductive member is exposed to a surface in the overlap section, and the terminal is connected to the first conductive member in the base section.

Advantageous Effects of Invention

According to the present invention, it is possible to provide a secondary battery including a conductive member having a section connected to a positive electrode terminal or a negative electrode terminal and a section connected to a bus bar, the secondary battery having a simple configuration, the conductive member enabling reliable welding to the positive electrode terminal or the negative electrode terminal, and the bus bar.

DESCRIPTION OF EMBODIMENTS

Hereinafter, an embodiment of the present invention will be described in detail based on the drawings. It should be noted that the present invention is not limited to following embodiment. Also, modification is possible as needed in a range not departing from the scope of the expected effect of the present invention.

Figure 1:
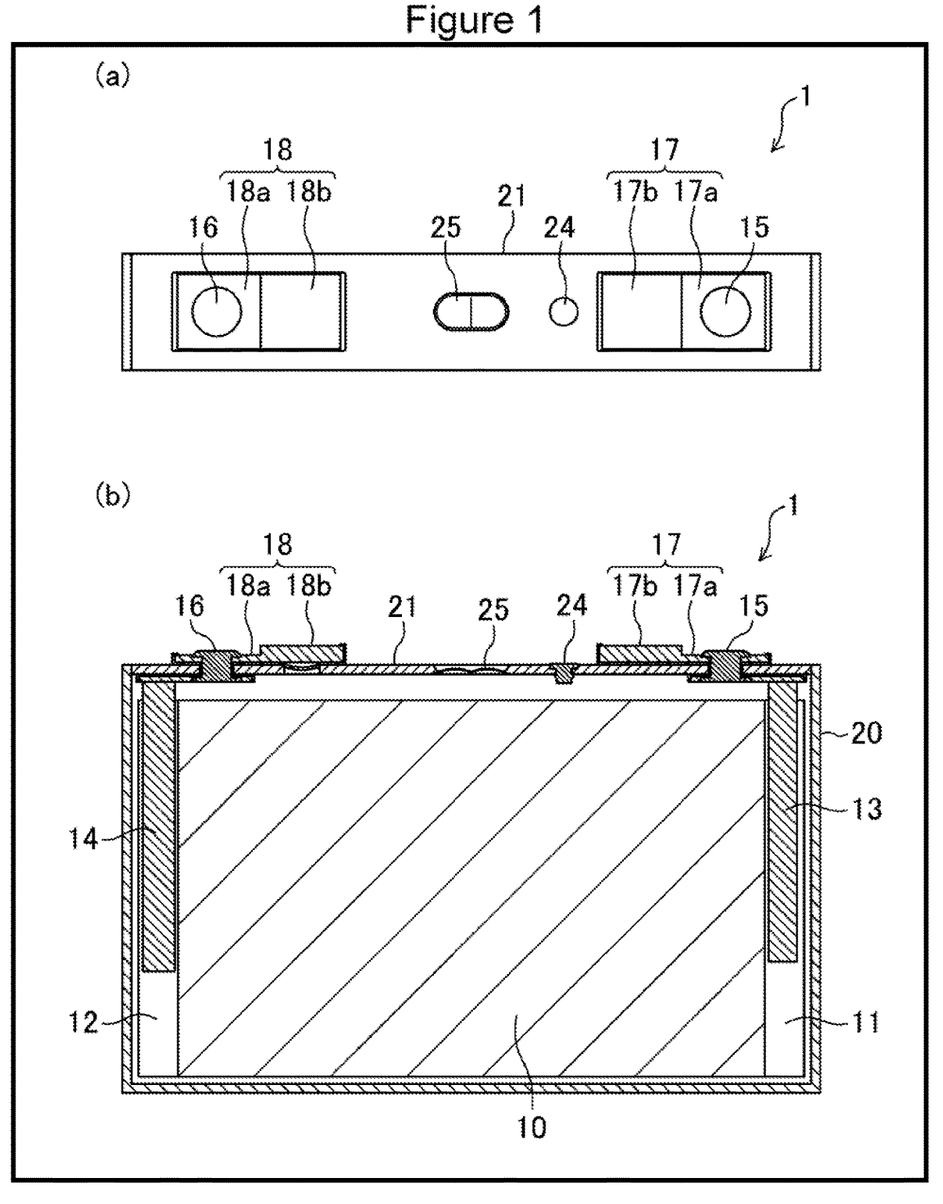
FIG. 1 schematically illustrates the configuration of a secondary battery in an embodiment of the present invention, (a) of FIG. 1 is a top view, and (b) of FIG. 1 is a cross-sectional view.

FIG. 1 schematically illustrates the configuration of a secondary battery 1 in an embodiment of the present invention, (a) of FIG. 1 is a top view, and (b) of FIG. 1 is a cross-sectional view.

As illustrated in (a), (b) of FIG. 1, in the secondary battery 1 in the embodiment, an electrode body 10, which is a power generation element, is housed in an exterior body 20 along with electrolyte solution. Also, an opening of the exterior body 20 is sealed by a sealing body 21. Here, the electrode body 10 has a structure in which a positive electrode plate and a negative electrode plate are wound or layered via a separator (both are not illustrated). In the positive electrode plate, a positive electrode active material layer containing a positive electrode active material is provided on a positive electrode core surface. In the negative electrode plate, a negative electrode active material layer containing a negative electrode active material is provided on a negative electrode core surface. In addition, the positive electrode plate and the negative electrode plate each have a positive electrode core exposed section 11 and a negative electrode core exposed section 12 at a side portion in which no active material layer is formed. The positive electrode plate and the negative electrode plate are arranged so that the positive electrode core exposed section 11 and the negative electrode core exposed section 12 extend in opposite directions.

It is to be noted that a positive electrode terminal 15 and a negative electrode terminal 16 are fixed to a sealing plate 12 via an insulating member (not illustrated) provided on the upper surface and the lower surface of the sealing plate 12. Although not illustrated in (a), (b) of FIG. 1, an insulating sheet, which has been bent into a box shape, is disposed between the electrode body 13 and the exterior body 11.

The positive electrode core exposed section 11 is connected to the positive electrode terminal 15 via a positive electrode current collector 13, and the negative electrode core exposed section 12 is connected to the negative electrode terminal 16 via a negative electrode current collector 14. The positive electrode terminal 15 and the negative electrode terminal 16 are each fixed to the sealing body 21 penetrating a through hole provided in the sealing body 21. Furthermore, the positive electrode terminal 15 and the negative electrode terminal 16 are connected to a positive electrode conductive member 17 and a negative electrode conductive member 18, respectively on the outer side of the sealing body 21. In addition, the positive electrode conductive member 17 and the negative electrode conductive member 18 have respective base sections 17a, 18a which are sections connected to the positive electrode terminal 15 and the negative electrode terminal 16, and respective overlap sections 17b, 18b which are sections connected to the bus bar. The positive electrode terminal 15 is inserted in a through hole provided in the base section 17a of the positive electrode conductive member 17, and the upper end of the positive electrode terminal 15 is swaged and fixed to the base section 17a. Also, a swaged part of the positive electrode terminal 15 is welded to the base section 17a. The negative electrode terminal 16 is inserted in a through hole provided in the base section 18a of the negative electrode conductive member 18, and the upper end of the negative electrode terminal 16 is swaged and fixed to the base section 18a. Also, a swaged part of the negative electrode terminal 16 is welded to the base section 18a.

The negative electrode terminal 16, and the negative electrode conductive member 18 are electrically insulated from the sealing body 21. For example, at least one of the positive electrode current collector 13, the positive electrode terminal 15, and the positive electrode conductive member 17 is in contact with the sealing body 21, and the positive electrode current collector 13, the positive electrode terminal 15, and the positive electrode conductive member 17 are thereby electrically connected to the sealing body 21. It is to be noted that the positive electrode current collector 13, the positive electrode terminal 15, and the positive electrode conductive member 17 can also be electrically insulate from the sealing body 21.

The sealing body 21 is provided with an injection inlet through which electrolyte solution is injected, and after the electrolyte solution is injected, the injection inlet is sealed by a sealing member 24. Also, the sealing body 21 is provided with a discharge valve 25 that, when the pressure inside the exterior body 20 increases, breaks to release the pressure.

When the secondary battery 1 is a non-aqueous electrolyte secondary battery, the positive electrode core, the positive electrode current collector 13, and the positive extreme child 15 are preferably made of aluminum or aluminum alloy. Also, the negative electrode core, the negative electrode current collector 14, and the negative electrode terminal 16 are preferably copper or copper alloy. It is also possible to provide a nickel layer on the surface of the negative electrode terminal 16.

The exterior body 20 and the sealing body 21 are preferably made of metal, and preferably made of aluminum, aluminum alloy, stainless steel, or iron.

Figure 2:
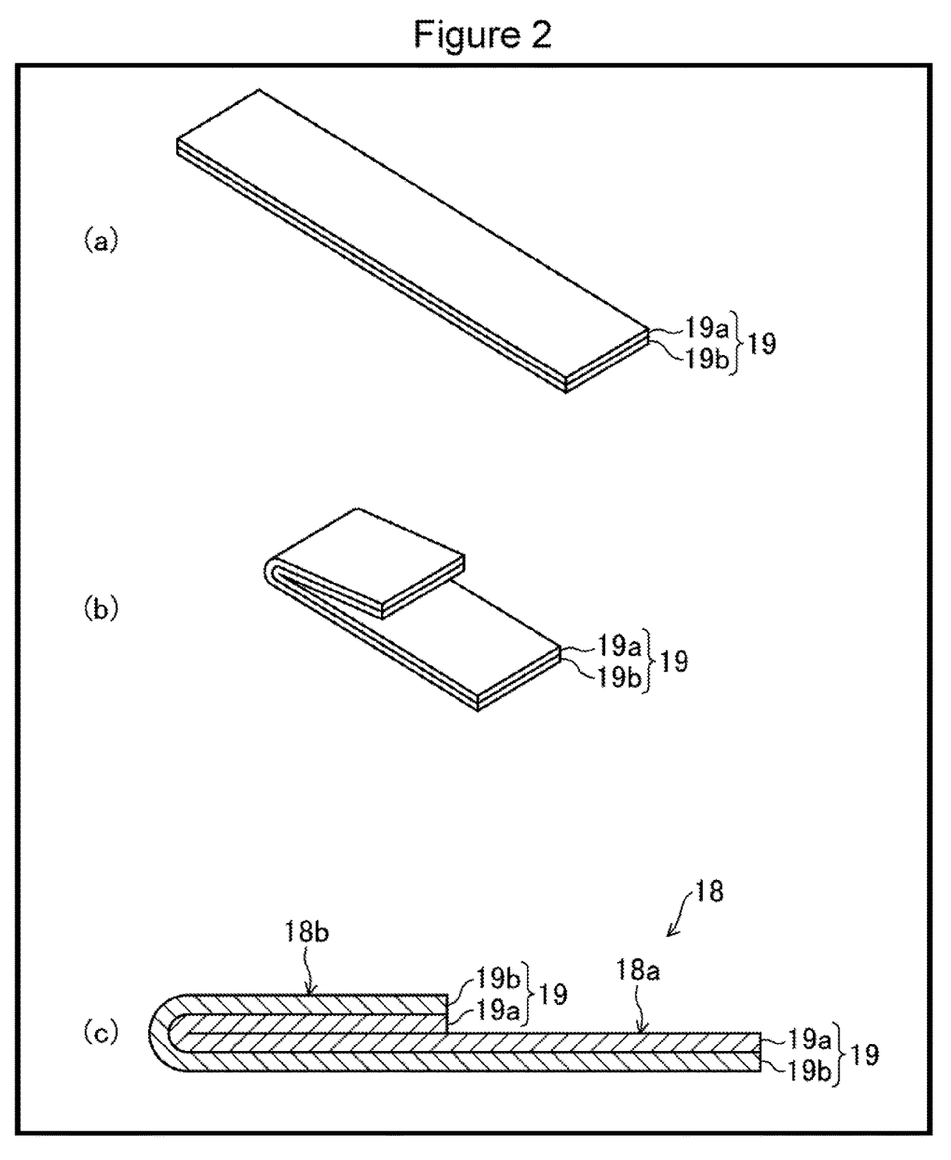
FIG. 2 (*a*) to (*c*) of FIG. 2 schematically illustrate the steps of producing a negative electrode conductive member in an embodiment of the present invention.

(a) to (c) of FIG. 2 schematically illustrate the steps of producing the negative electrode conductive member 18 in the embodiment.

As illustrated in (a) of FIG. 2, a cladding material 19 is prepared, in which a plate-shaped first conductive member 19a and the second conductive member 19b are stacked. Here, the first conductive member 19a is made of metal of the same type as the negative electrode terminal 16. Also, the second conductive member 19b is made of metal of the same type as the bus bar. For example, when the negative electrode terminal 16 is made of copper or copper alloy, the first conductive member 19a is made of copper or copper alloy, and when the bus bar is made of aluminum or aluminum alloy, the second conductive member 19b is made of aluminum or aluminum alloy.

Subsequently, as illustrated in (b) of FIG. 2, one end of the cladding material 19 is folded so that surfaces of the first conductive member 19a are overlaid on the other. Thus, as illustrated in (c) of FIG. 2, the negative electrode conductive member 18 is produced, which includes an overlap section 18b in which surfaces of the first conductive member 19a are overlaid on the other, and a base section 18a in which surfaces of the first conductive member 19a are not overlaid on the other.

As illustrated in (c) of FIG. 2, in the negative electrode conductive member 18 in the embodiment, the first conductive member 19a is exposed to the surface in the base portion 18a, and the second conductive member 19b is exposed to the surface in the overlap section 18b. Therefore, as illustrated in (a), (b) of FIG. 1, when the negative electrode conductive member 18 is disposed outwardly of the sealing body 21, in the base portion 18a in which the first conductive member 19a is exposed to the surface, the negative electrode terminal 16 is connected, and in the overlap section 18b in which the second conductive member 19b is exposed to the surface, the bus bar is connected. In the base section 18a, a through hole is formed, through which the negative electrode terminal 16 is inserted. The timing of forming the through hole may be either before or after the bending of the cladding material 19.

In the embodiment, the first conductive member 19a is made of metal of the same type as the negative electrode terminal 16, thus the negative electrode terminal 16 and the negative electrode conductive member 18 can be joined by welding between the same type of metal. Also, the second conductive member 19b is made of metal of the same type as the bus bar, thus the bus bar and the negative electrode conductive member 18 can be joined by welding between the same type of metal. Thus, even when the negative electrode terminal 16 and the bus bar are made of different metals, it is possible to obtain a secondary battery including the negative electrode conductive member 18 which enables reliable welding to the negative electrode terminal 16 and the bus bar.

When the positive electrode terminal 15 is made of the metal of the same type (for example, aluminum or aluminum alloy) as the bus bar, it is sufficient that the positive electrode conductive member 17 be made of metal of the same type as the positive electrode terminal 15. Consequently, the positive electrode terminal 15 and the bus bar can be joined to the positive electrode conductive member 17 by welding between the same type of metal.

In contrast, when the positive electrode terminal 15 and the bus bar are made of different types of metal, a cladding material is prepared, in which the first conductive member made of metal of the same type as the positive electrode terminal 15, and the second conductive member made of metal of the same type as the bus bar staked are stacked, and the positive electrode conductive member 17 may be produced by folding the cladding material so that surfaces of the first conductive member are overlaid on the other. In this situation, in the base section in which surfaces of the first conductive member are not overlaid on the other, the positive electrode terminal 15 and the positive electrode conductive member 17 can be joined together by welding between the same type of metal. Also, in an overlap section in which surfaces of the first conductive member are overlaid on the other, the bus bar and the positive electrode conductive member 17 can be joined together by welding between the same type of metal.

According to the embodiment, in a secondary battery including a conductive member having a section connected to the positive electrode terminal or the negative electrode terminal and a section connected to the bus bar, a conductive member is produced by folding a cladding material in which the first conductive member and the second conductive member are stacked so that surfaces of the first conductive member are overlaid on the other, and thereby in the base portion in which surfaces of the first conductive member are not overlaid on the other, the positive electrode terminal or the negative electrode terminal, and the conductive member can be joined together by welding between the same type of metal. In the overlap section in which surfaces of the first conductive member are overlaid on the other, the bus bar and the conductive member can be joined together by welding between the same type of metal. Consequently, even when the positive electrode terminal 15 or the negative electrode terminal 16 and the bus bar are made of different metals, it is possible to obtain a secondary battery including the conductive member which enables reliable welding to the positive electrode terminal 15 or the negative electrode terminal 16 and the bus bar.

In the embodiment, it is sufficient that metal of the same type as the positive electrode terminal or the negative electrode terminal be used for the first conductive member 19a, and metal of the same type as the bus bar be used for the second conductive member 19b as the cladding material including the conductive member.

Since the conductive member in the embodiment is produced by folding one end of a cladding material in which the first conductive member and the second conductive member are stacked, a conductive member of high strength can be obtained at a low cost.

Figure 3:
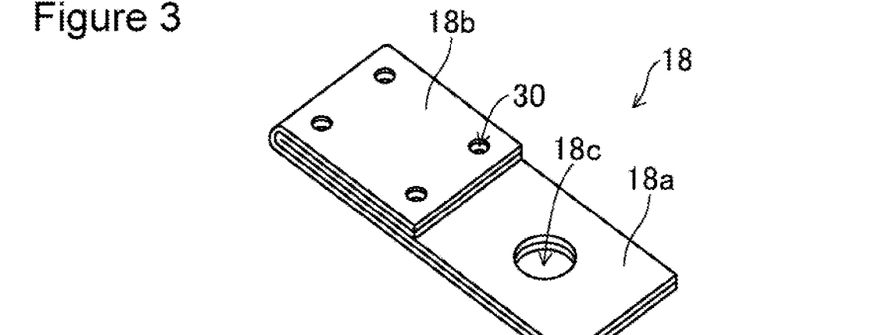
FIG. 3 is a perspective view schematically illustrating the configuration of a conductive member in which a connection section is provided in an overlap section.

FIG. 3 is a perspective view schematically illustrating the configuration of a conductive member in which the resistance value in the overlap section is reduced.

As illustrated in FIG. 3, the overlap section 18b of the conductive member 18 has a connection section 30 in which a cladding material is folded and opposed surfaces of the first conductive member are fixedly connected to each other. The base section 18a is provided with a through hole 18c through which the positive electrode terminal or the negative electrode terminal penetrates.

When the connection section 30, in which opposed surfaces of the first conductive member are fixedly connected, is formed in this manner, it is possible to reduce the resistance value between a portion, to which the bus bar is connected, of the overlap section 18b, and a portion, to which the negative electrode terminal 16 is connected, of the base section 18a.

Figure 4:
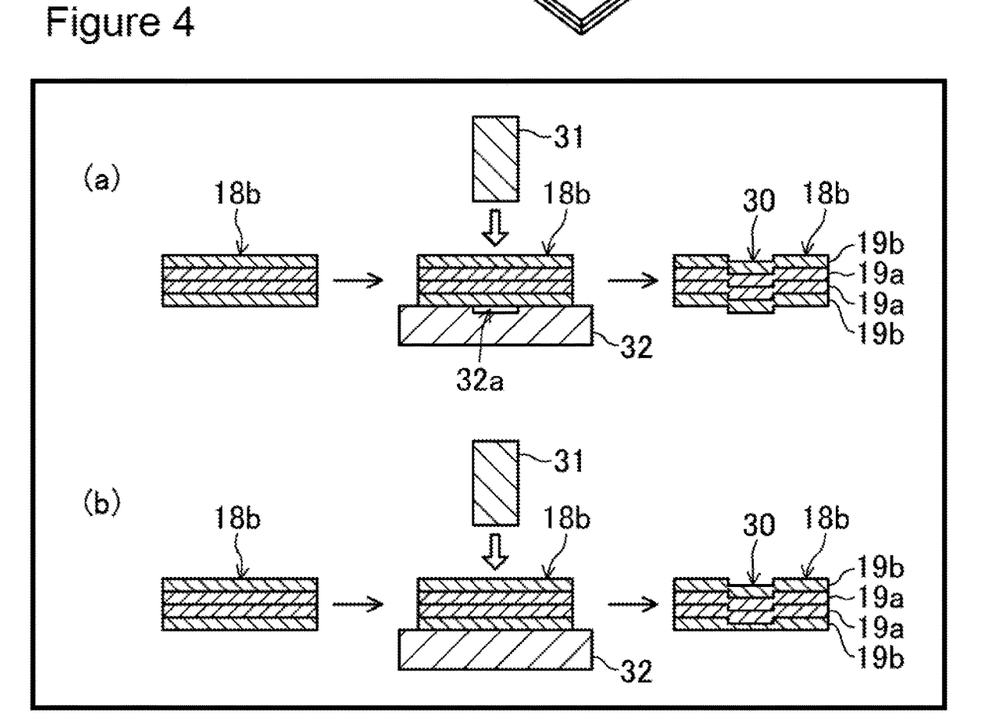
FIG. 4 (*a*), (*b*) of FIG. 4 are cross-sectional views schematically illustrating a method of forming the connection section.

The connection section 30 can be formed, for example, by the method as illustrated in (a), (b) of FIG. 4. Here, (a), (b) of FIG. 4 only illustrate a cross-section of the overlap section 18b.

In the method illustrated in (a) of FIG. 4, the overlap section 18b is placed on a die 32, on the surface of which a recessed section 32a is formed, and press working is carried out on the overlap section 18b from the above using a punch 31. Consequently, of the first conductive members 19a which are opposed and overlaid on the other, part of the surface of the first conductive member 19a on the upper side is embedded inside the first conductive member 19a on the lower side, and the connection portion 30 is formed. At this point, a recessed section is formed on the surface of the second conductive member 19b on the upper side, and a projecting section is formed on the surface of the second conductive member 19b on the lower side.

In the method illustrated in (b) of FIG. 4, press working is carried out on the overlap section 18b from the above using a die 32, on the surface of which no recessed section is formed. In this case, although a recessed section is formed on the surface of the second conductive member 19b on the upper side, no recessed section is formed on the surface of the second conductive member 19b on the lower side.

It should be noted that although the connection sections 30 illustrated in FIG. 3 are formed at the four corners of the overlap section 18b, without being limited to this, any number of connection sections 30 may be formed at any positions. Each connection section 30 is preferably provided at a position at least in the vicinity of the boundary between the base section 18a and the overlap section 18b. With this configuration, it is possible to further reduce the resistance value between a portion, to which the bus bar is connected, of the overlap section 18b, and a portion, to which the negative electrode terminal 16 is connected, of the base section 18a. Also, in the vicinity of the boundary between the base section 18a and the overlap section 18b, it is possible to more reliably prevent deformation of the negative electrode conductive member, which causes the opposed surfaces of the first conductive member 19a to be separated.

In the negative electrode conductive member 18 illustrated in FIG. 3, the folded section of the plate-shaped member 19 is formed at one end of the negative electrode conductive member 18 in a longitudinal direction. As another embodiment, the folded section of the plate-shaped member 19 may be formed at one end of the negative electrode conductive member 18 in a transverse direction. In this case, after the plate-shaped member 19 is folded, the width of the portion serving as the overlap section should be greater than the width of the portion serving as the base portion.

Figure 5:
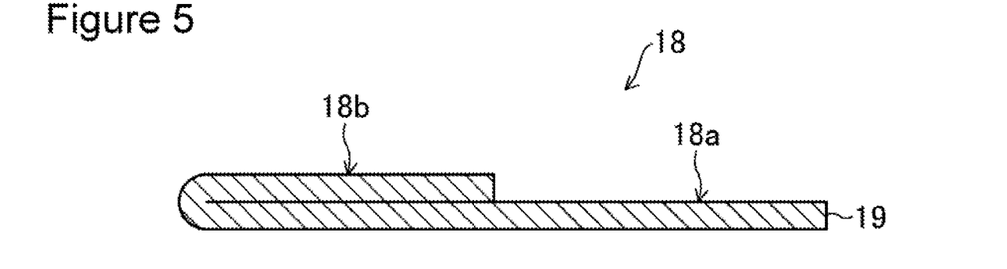
FIG. 5 is a cross-sectional view schematically illustrating the configuration of a negative electrode conductive member in another embodiment of the present invention.

Although the present invention has been described so far by way of a preferred embodiment, the description is not the limitation, and needless to say, various changes are possible. For example, in the embodiment, the negative electrode conductive member is produced by folding one end of a cladding material in which the first conductive member and the second conductive member are stacked. However, as illustrated in FIG. 5, the negative electrode conductive member 18 may be produced by folding one end of a single plate-shaped conductive member 19. In this case, the negative electrode conductive member 18 has an overlap section 18b in which opposed surfaces are overlaid on the other, and a base section 18a in which no surfaces are overlaid on the other. In the base section 18a, the negative electrode terminal can be connected to the negative electrode conductive member 18. In addition, the overlap section 18b may be a section to be joined to the bus bar.

Since thus configured negative electrode conductive member 18 is produced by folding one end of the plate-shaped conductive member 19, the negative electrode conductive member 18 having portions with different thicknesses is producible by a simpler method. The negative electrode conductive member 18 has the base section 18a with a small thickness, and the overlap section 18b with a large thickness. Therefore, in the negative electrode conductive member 18, the surface (the upper surface of the overlap section 18b) to which the bus bar is connected, and the surface (the upper surface of the base section 18a) to which the negative electrode terminal 16 is connected do not have the same height. Thus, when the bus bar is connected to the overlap section 18b of the negative electrode conductive member 18, it is possible to more reliably prevent damage of the connection section 30 due to contact of the bus bar or the jig with the base section 18a of the negative electrode conductive member 18 and the connection section of the negative electrode terminal 16.

When a bus bar is laser-welded to the overlap section 18b, more solid welding connection can be made by a laser with higher energy without damaging members disposed under the overlap section 18b. Here, since the thickness of the base section 18a is smaller than the thickness of the overlap section 18b, the above-described effects are obtained without increasing the height of the secondary battery in the vicinity of the connection section between the negative electrode terminal 17 and the negative electrode conductive member 18. The members disposed under the overlap section 18b include the sealing plate, an insulating member disposed between the sealing plate and the negative electrode conductive member 18, and a reverse plate described later.

The positive electrode conductive member 17 may also be produced by folding one end of the single plate-shaped conductive member.

Figure 6:
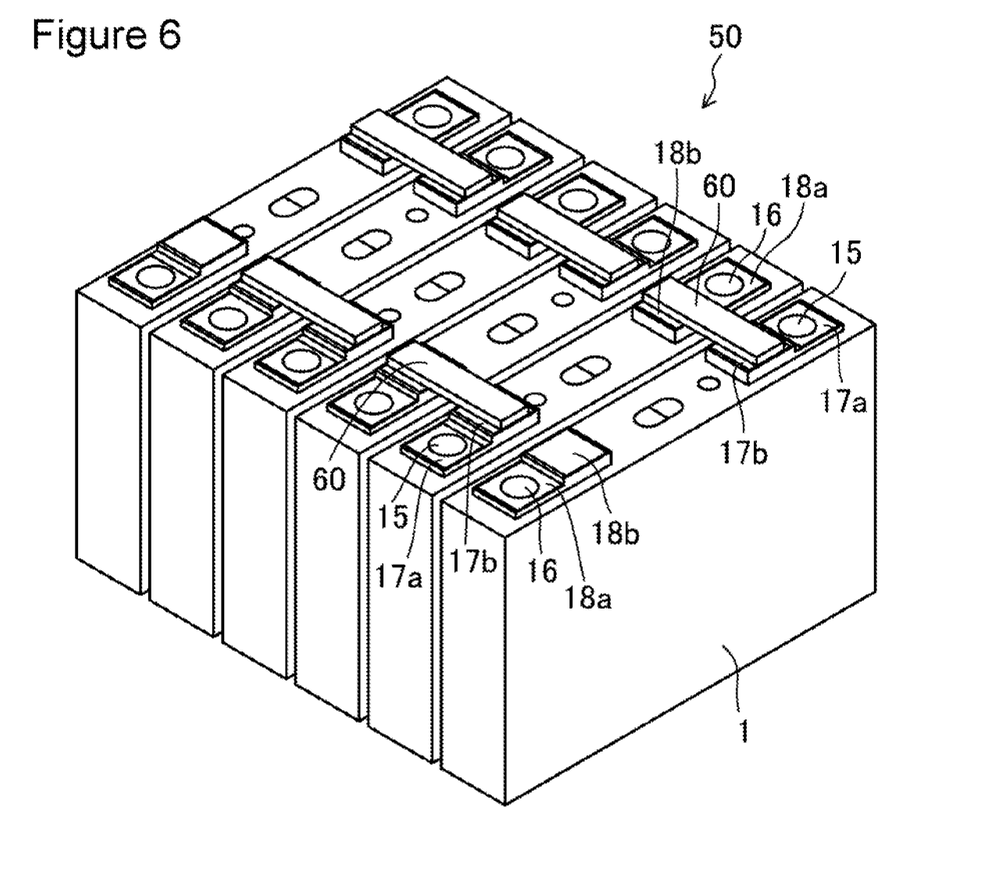
FIG. 6 is a perspective view schematically illustrating an assembled battery formed by arranging multiple secondary batteries in the present invention.

An assembled battery can also be formed by arranging multiple secondary batteries 1 in the present invention. FIG. 6 is a perspective view illustrating an example of an assembled battery 50 formed by arranging six secondary batteries 1 in the present invention.

As illustrated in FIG. 6, the positions of the positive electrode terminal 15 and the negative electrode terminal 16 of each second battery 1 are alternately changed and arranged, and the positive electrode terminal 15 and the negative electrode terminal 16 of adjacent secondary batteries 1 are jointed with the bus bar 60, thereby providing six secondary batteries 1 electrically connected in series. For example, when the positive electrode terminal 15 and the bus bar 60 are made of aluminum or aluminum alloy, and the negative electrode terminal 16 is made of copper or copper alloy, the positive electrode conductive member 17 and the negative electrode conductive member 18 having the following configuration may be used.

Specifically, as illustrated in FIG. 5, the positive electrode conductive member 17 may be used, which is produced by folding one end of the plate-shaped member 19 made of aluminum or aluminum alloy, and has the overlap section 18b in which opposed surfaces are overlaid on the other, and the base section 18a in which no surfaces are overlaid on the other. Also, as illustrated in FIG. 2, the negative electrode conductive member 18 may be used, which is produced by folding one end of the cladding material 19 in which the first conductive member 19a made of copper or copper alloy, and the second conductive member 19b made of aluminum or aluminum alloy are stacked, so that surfaces of the first conductive member 19a are overlaid on the other, and the negative electrode conductive member 18 has the overlap section 18b in which opposed surfaces are overlaid on the other, and the base section 18a in which no surfaces are overlaid on the other.

Using the positive electrode conductive member 17 and the negative electrode conductive member 18 configured in this manner, in the base section 17a of the positive electrode conductive member 17, the positive electrode terminal 15 can be joined by welding between the same type of metal (aluminum or aluminum alloy). Also, in the base section 18a of the negative electrode conductive member 18, the negative electrode terminal 16 can be joined by welding between the same type of metal (copper or copper alloy). Furthermore, the overlap section 17b of the positive electrode conductive member 17 connected to the positive electrode terminal 15, and the overlap section 18b of the negative electrode conductive member 18 connected to the negative electrode terminal 16 of adjacent secondary batteries 1 can be weld with the bus bar 60 made of the same type of metal (aluminum or aluminum alloy). As a consequence, even when the positive electrode terminal 15 and the negative electrode terminal 16 of the secondary battery 1 are made of different metals, it is possible to obtain an assembled battery 50 which enables reliable welding to the positive electrode terminal 15, the negative electrode terminal 16, and the bus bar 60. It is to be noted that both the positive electrode conductive member and the negative electrode conductive member do not need to be produced by folding one end of the plate-shaped member 19. For example, it is also possible to use a conductive member on which no folding is performed, as the positive electrode conductive member.

Figure 7:
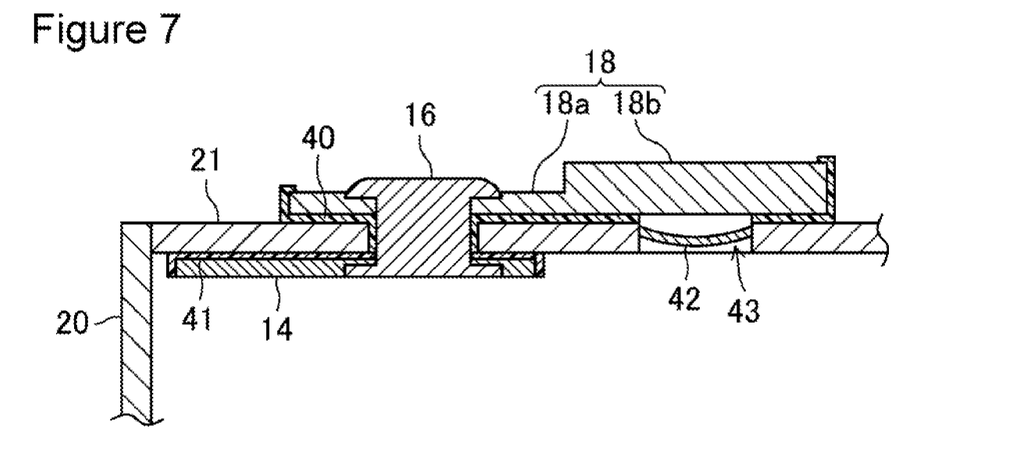
FIG. 7 is a partial cross-sectional plan view schematically illustrating the configuration of a secondary battery including a reverse plate (short circuit mechanism).

As illustrated in FIG. 7, in the secondary battery in the present invention, a reverse plate (short circuit mechanism) 42 may be provided in the vicinity of the negative electrode terminal 16.

As illustrated in FIG. 7, the negative electrode terminal 16 is fixed to the sealing body 21 penetrating a through hole provided in the sealing body 21. The negative electrode conductive member 18 disposed on the outer side of the sealing body 21 is connected to the negative electrode terminal 16 in the base portion 18a. Also, the negative electrode terminal 16 is connected to the negative electrode current collector 14 on the inner side of the sealing body 21. It is to be noted that the sealing body 21 is electrically insulated from the negative electrode terminal 16 and the negative electrode current collector 14 by insulating members 40, 41. In contrast, the positive electrode terminal (not illustrated) is electrically connected to the sealing body 21, thus the sealing body 21 has the same polarity as that of the positive electrode terminal.

A hollow section 43 is formed in part the sealing bodies 21, and the reverse plate 42 as a variable member is disposed so as to cover the hollow section 43. Here, the reverse plate 42 is electrically connected to the sealing body 21, and has the same polarity as that of the positive electrode terminal. Also, the overlap section 18b of the negative electrode conductive member 18 extends upwardly of the hollow section 43. When the secondary battery is in an overcharged state, and the pressure inside the exterior body 20 reaches a setting value or greater, the reverse plate 42 is reversed, and comes into contact with the overlap section 18b of the negative electrode conductive member 18. Thus, the reverse plate 42 operates as a short circuit mechanism which causes short-circuit between the positive electrode plate and the negative electrode plate outwardly of the electrode body.

In FIG. 7, the reverse plate (short circuit mechanism) 42 is provided in the vicinity of the negative electrode terminal 16, however, may be provided in the vicinity of the positive electrode terminal. In this case, the positive electrode terminal is electrically insulated from the sealing body, whereas the negative electrode terminal is electrically connected to the sealing body 21.

The reverse plate is preferably made of aluminum or aluminum alloy. In the negative electrode conductive member, the second conductive member including a surface opposed to the reverse plate is also preferably made of aluminum or aluminum alloy. Consequently, when the reverse plate and the second conductive member come into contact with each other, the reverse plate and the second conductive member are melted and connected. Therefore, a short-circuit current flows more reliably, and it is possible to reliably blow out a fuse section formed in the positive electrode current collector or the positive electrode conductive member. The first conductive member is preferably made of copper or copper alloy. Consequently, even when the second conductive member, which has come into contact with the reverse plate, is melted, it is possible to reliably prevent formation of an opening or the like in the negative electrode conductive member.

The secondary battery 1 in the present invention is not particularly limited in type, and is applicable to a lithium-ion secondary battery, and a nickel hydrogen secondary battery, for example. Also, the structure of the electrode body 10 is not particularly limited. Also, publicly known materials may be used for the positive electrode, the negative electrode, the separator, and the electrolyte solution.

REFERENCE SIGNS LIST 1 secondary battery
10 electrode body
11 positive electrode core exposed section
12 negative electrode core exposed section
13 positive electrode current collector
14 negative electrode current collector
15 positive electrode terminal
16 negative electrode terminal
17 positive electrode conductive member
17a base section
17b overlap section
18 negative electrode conductive member
18a base section
18b overlap section
18c through hole
19 cladding material (plate-shaped member)
19a first conductive member
19b second conductive member
20 exterior body
21 sealing body
24 sealing member
25 discharge valve
30 connection section
31 punch
32 die
32a recessed section
40, 41 insulating member
42 reverse plate (short circuit mechanism)
43 hollow section
50 assembled battery
60 bus bar

The invention claimed is:

1. A secondary battery comprising:
an electrode body including a positive electrode plate and a negative electrode plate;
an exterior body that has an opening and houses the electrode body;
a sealing body that seals the opening; a terminal that is provided in the sealing body, and connected to the positive electrode plate or the negative electrode plate; and
a conductive member that is disposed on an outer side of the sealing body, and is connected to the terminal, wherein the conductive member has an overlap section in which one end of a conductive plate-shaped member is folded and opposed surfaces are overlaid on other, and a base section in which no surfaces are overlaid on other, wherein the opposing surfaces directly contact each other in the overlapped section, and
the terminal is connected to the conductive member in the base section, wherein the conductive member is electrically connected to the electrode body via the terminal.

2. The secondary battery according to claim 1,
wherein the plate-shaped member includes a cladding material in which a first conductive member and a second conductive member each in a plate shape are stacked,
the first conductive member is made of a same type of metal as the terminal,
in the overlap section, the first conductive member is folded so that surfaces of the first conductive member are overlaid on other,
in the conductive member, the first conductive member is exposed to a surface in the base section and the second conductive member is exposed to a surface in the overlap section, and
the terminal is connected to the first conductive member in the base section.

3. The secondary battery according to claim 2,
wherein the second conductive member is made of a same type of metal as a bus bar, and
the overlap section is a section to be joined to the bus bar.

4. The secondary battery according to claim 1,
wherein the overlap section has a connection section in which folded and opposed surfaces are fixedly connected to each other.

5. The secondary battery according to claim 4,
wherein in the connection section, folded and opposed surfaces are crimp-connected to each other.

6. The secondary battery according to claim 2,
wherein the first conductive member is made of copper or copper alloy, and the second conductive member is made of aluminum or aluminum alloy.

7. A method of manufacturing a secondary battery including:
an electrode body including a positive electrode plate and a negative electrode plate;
an exterior body that has an opening and houses the electrode body;
a sealing body that seals the opening; and a terminal that is provided in the sealing body, and connected to the positive electrode plate or the negative electrode plate,
the method comprising:
folding one end of a conductive plate-shaped member to have an overlap section in which folded and opposed surfaces are overlaid on other, and a base section in which no surfaces are overlaid on other; disposing the conductive member in the sealing body; and
connecting the terminal to the conductive member, wherein the opposing surfaces directly contact each other in the overlapped section,
wherein the terminal is connected to the conductive member in the base section, wherein the conductive member is electrically connected to the electrode body via the terminal.

8. The method of manufacturing a secondary battery according to claim 7,
wherein the plate-shaped member includes a cladding material in which a first conductive member and a second conductive member each in a plate shape are stacked,
the first conductive member is made of a same type of metal as the terminal, and
the overlap section is formed by folding the plate-shaped member so that surfaces of the first conductive member are overlaid on other.

9. A method of manufacturing a conductive member included in the secondary battery according to claim 1,
wherein the conductive member is a conductive plate-shaped member, and
one end of the plate-shaped member is folded, and a conductive member is formed, which has an overlap section in which folded and opposed surfaces are overlaid on other, and a base section in which no surfaces are overlaid on other.

10. The method of manufacturing a conductive member for a secondary battery according to claim 9,
wherein the plate-shaped member includes a cladding material in which a first conductive member and a second conductive member each in a plate shape are stacked,
the first conductive member is made of a same type of metal as the terminal, and
the overlap section is formed by folding the plate-shaped member so that surfaces of the first conductive member are overlaid on other.

* * * * *